United States Patent
Laporte et al.

(10) Patent No.: US 7,874,523 B2
(45) Date of Patent: Jan. 25, 2011

(54) METHOD OF CONTROLLING AN AIRCRAFT IN FLIGHT, ESPECIALLY TO REDUCE WAKE VORTICES

(75) Inventors: Florent Laporte, Toulouse (FR); Heinz Hansen, Weyhe (DE)

(73) Assignee: Airbus Deutschland GmbH, Hamburg (DE)

(*) Notice: Subject to any disclaimer, the term of this patent is extended or adjusted under 35 U.S.C. 154(b) by 1089 days.

(21) Appl. No.: 11/486,911

(22) Filed: Jul. 14, 2006

(65) Prior Publication Data

US 2007/0108350 A1    May 17, 2007

(30) Foreign Application Priority Data

Jul. 22, 2005    (EP) ................... 05106780

(51) Int. Cl.
*B64C 23/06*    (2006.01)
(52) U.S. Cl. .................................... 244/199.1
(58) Field of Classification Search .............. 244/199.1, 244/199.2, 199.3, 204.1, 215, 199.4, 213
See application file for complete search history.

(56) References Cited

U.S. PATENT DOCUMENTS

| | | | |
|---|---|---|---|
| 6,082,679 A * | 7/2000 | Crouch et al. ............ | 244/199.3 |
| 6,177,888 B1 | 1/2001 | Cabot et al. | |
| 6,422,518 B1 | 7/2002 | Stuff et al. | |
| 6,719,246 B2 | 4/2004 | Corjon et al. | |
| 2001/0030264 A1 | 10/2001 | Huenecke | |

FOREIGN PATENT DOCUMENTS

| | | |
|---|---|---|
| EP | 1 145 954 | 10/2001 |
| EP | 1 236 641 | 9/2002 |
| WO | WO 00/10064 | 8/1999 |

OTHER PUBLICATIONS

D. R. Croom, "Evaluation of Flight Spoilers for Vortex Alleviation", Journal of Aircraft, Aug. 1977, vol. 14, No. 8 pp. 823-825.
J. Hallock et al., "Ground-Based Measurements of the Wake Vortex Characteristics of a B-747 Aircraft in Various Configurations", AIAA 15th Aerospace Sciences Meeting, Paper 77-9, 1977, pp. 1 to 8.
V. J. Rossow, "Lift-Generated Wakes of Subsonic Transport Aircraft", Progress in Aerospace Science 35, 1999, pp. 507-660.

* cited by examiner

*Primary Examiner*—Timothy D Collins
*Assistant Examiner*—Valentina Xavier
(74) *Attorney, Agent, or Firm*—W. F. Fasse; W. G. Fasse

(57) ABSTRACT

The flight of an aircraft is controlled by controlling the aircraft propulsion thrust and adjusting aerodynamic control elements so that the aircraft flies along a specified flight path. In order to reduce wake vortices generated by and trailing behind the aircraft, a wake vortex parameter is determined as a function of a spoiler deflection, and a spoiler element is adjusted to a spoiler deflection value in an optimum range in which the spoiler influence on the wake vortex parameter is maximized and the spoiler influence on the aircraft performance is at its lowest level for achieving that maximum spoiler influence on the wake vortex parameter.

18 Claims, 2 Drawing Sheets

METHOD OF CONTROLLING AN AIRCRAFT IN FLIGHT, ESPECIALLY TO REDUCE WAKE VORTICES

PRIORITY CLAIM

This application is based on and claims the priority under 35 U.S.C. §119 of European Patent Application 05 106 780.9, filed on Jul. 22, 2005, the entire disclosure of which is incorporated herein by reference.

FIELD OF THE INVENTION

The invention relates to a method of controlling an aircraft in flight, especially so as to reduce wake vortices being produced by and trailing behind the aircraft.

BACKGROUND INFORMATION

Aircraft wings are generally equipped with aerodynamic control elements including control surfaces such as ailerons, elevators, rudders and spoilers, as well as high lift devices such as flaps and slats. These aerodynamic control elements are independently operable and controllable so as to define the lifting force produced by the respective wing and the respective aerodynamic control element, and to control the drag forces being generated. Thereby, appropriate operation of the control elements makes it possible to adjust the flight attitude and to steer the aircraft along an ascending or descending flight path, as well as with a rolling motion and/or yawing motion. The rolling motion is controlled by asymmetric deflection of respective suitable control elements on the left and right wings respectively, while the ascending or descending flight attitude is controlled by symmetric deflection of respective suitable control elements on the two wings. It is known to deploy the spoilers in order to reduce lift and increase drag and thereby achieve a steeper descent of the aircraft by symmetric deflection of the spoilers on both wings in an airbrake mode. It is further known to deploy the spoilers to control or enhance a rolling motion by asymmetric deflection of the spoilers on both wings.

During flight, an aircraft generates wake turbulence that trails behind the aircraft. Such wake turbulence mainly comprises wake vortices that are initiated at the trailing edges and the wing tips of the wings, and spiral or helically trail behind the wing as a direct consequence of the lift generation by the wing. These spiraling vortices trailing behind in the wake of an aircraft (the so-called "leader aircraft") may interfere with or even become hazardous to any other aircraft (the so-called "follower aircraft") that follows too close behind the leader aircraft. For this reason, applicable flight regulations specify longitudinal Wake Turbulence Separation Standards that must be maintained between successive aircraft approaching an airport terminal area. The existing standards are based on the maximum take-off weight category of the leader aircraft and the follower aircraft under consideration. These standards are usually specified in nautical miles (NM), and range from 3 NM for a light follower aircraft trailing behind a light leader aircraft, up to 6 NM for a light follower aircraft in trail of a heavy aircraft. The required application of Wake Turbulence Separation Standards at airports limits the number of aircraft that can land on a given runway during a given period of time and thus limits total flight throughput capacity of the airport.

It has been proposed in the prior art, to install warning systems to warn aircraft of wake turbulence conditions in the vicinity of airports, as well as guidance systems for guiding aircraft with appropriate wake turbulence separation during the approach to airports. For example, U.S. Pat. No. 6,177,888 discloses a wake turbulence warning and caution system and method, in which the wake trajectory of a nearby aircraft is calculated, and warning functions are implemented aboard the protected aircraft that follows or will intersect the trailing wake of the leader aircraft. PCT Publication WO 00/010064 discloses an aircraft approach method and instrument landing system for carrying out such a method. Each aircraft approaching an airport is guided along an individual trajectory. Such individualized descent and landing trajectories, which each have an individual descent slope, provide a higher landing rate of successive aircraft while avoiding problems of wake turbulence that require sufficient separation distance between successive landing aircraft.

It has further been considered in the prior art, and has been the subject of research, to provide aerodynamic control elements and methods of operation thereof, to influence the creation as well as the attenuation and decay of wake vortices. Particularly, it has been considered in the prior art whether aircraft spoilers would be effective for reducing such wake vortices. For example, it has been considered to use existing spoilers to generate lo turbulence that might reduce the hazard of vortices in the wake, but it was determined that the effect of spoilers, control of engine thrust, and the use of other turbulence injection devices was mainly a reduction of the rotary velocity near the core of wake vortices, and did not seem to sufficiently accelerate the decay of the vortices (V. Rossow, "Lift-Generated Wakes of Subsonic Transport Aircraft", Progress in Aerospace Science 35, 1999, pages 507-660). Further, the symmetrical deflection of various combinations of spoiler segments on an aircraft, with a constant deflection angle of 45°, found that existing flight spoilers with such a large constant deflection angle may be capable of attenuating trailing vortices (D. R. Croom, "Evaluation of Flight Spoilers for Vortex Alleviation", Journal of Aircraft, August 1977, pages 823-825). Still further, tests were conducted on an aircraft with different flap settings and a fixed or constant spoiler extension of 41°, to conclude that the spoilers produced vortices with large cores, and that the deployment of flaps and spoilers with the stated large constant extension angle enhanced the decay of the vortex peak tangential velocity in the near field wake behind the aircraft, while the aircraft attitude, glide slope and deployment of landing gear had little influence on the vortex decay process (J. Hallock et al., "Ground-Based Measurements of the Wake Vortex Characteristics of a B-747 Aircraft in Various Configurations", AIAA 15th Aerospace Sciences Meeting, Paper 77-9, 1977, Pages 1 to 8).

The prior art has thus considered the use of statically deflected spoilers for vortex attenuation purposes. On the other hand, due to the reduction of lift and increase of drag, it would be highly uneconomical to fly with spoilers symmetrically deployed at such a large constant deflection angle. Even during steep approach, such deflection of spoilers is only appropriate temporarily for glide slope capture or for intermittent airbrake mode. Moreover, the spoiler settings for airbrake mode are not designed to be efficient for wake alleviation. Still further, the approach and landing phase of flight requires asymmetric use of spoilers for lateral control, but such asymmetric spoiler deflection has not been shown to be effective on wake alleviation, and is not compatible with wake alleviation because such spoiler deflection for lateral control is applied only intermittently and temporarily, while spoiler deflection for vortex alleviation would need to be applied constantly. Even more importantly, the large spoiler deflections (more than 40°) that have been tested for wake alleviation in the prior art, cause a significant degradation of aircraft performance due to decreased lift and increased drag, and as such are not applicable for wake alleviation during standard approach and landing phase operation of an aircraft.

SUMMARY OF THE INVENTION

In view of the above, it is an object of the invention to provide a method of controlling an aircraft so as to reduce the effect of wake turbulence trailing behind the leader aircraft, in particular on follower aircraft that follow the leader aircraft or intersect its wake. Another object of the invention is to achieve an optimum balance between maximum attenuation of the wake vortex and minimum degradation of the aircraft flight performance parameters, through optimized spoiler settings. Still further, the invention aims to minimize Wake Turbulence Separation Standards for wake generator or leader aircraft equipped with spoilers that are operated according to the inventive method. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method of controlling an aircraft in flight, respectively according to various aspects or embodiments.

In a first aspect, the invention involves a method of controlling an aircraft in flight, comprising the steps:
  a) flying the aircraft along a flight path while generating a wake vortex that trails behind the aircraft;
  b) extending an aerodynamic control element of the aircraft and thereby reducing a vortex strength of the wake vortex relative to a condition without the aerodynamic control element extended;
  c) continuing to extend the aerodynamic control element to increasing extension settings while thereby the vortex strength continues to reduce; and
  d) stopping and maintaining the aerodynamic control element at a particular extension setting when a rate of reduction of the vortex strength relative to an increase of the increasing extension settings diminishes or no later than when the rate of reduction reaches zero.

In another aspect, the invention involves a method of reducing a wake vortex generated by an aircraft, comprising the steps:
  a) determining a wake vortex parameter of the wake vortex as a function of a spoiler deflection angle of a spoiler element of the aircraft;
  b) flying the aircraft along a flight path while generating the wake vortex;
  c) during the step b), deflecting the spoiler element to a selected value of the spoiler deflection angle at which the spoiler element produces a maximum change of the wake vortex parameter relative to a zero value of the spoiler deflection angle, and at which the spoiler element produces a minimum change of a flight efficiency of the aircraft flying along the flight path while producing the maximum change of the wake vortex parameter.

According to a further embodiment of the invention, the selected value is a value of the spoiler deflection angle which maximizes a ratio of a change of the wake vortex parameter relative to a change of the flight efficiency.

The inventors have determined that a wake vortex having particular characteristics has a lower vortex strength and is thus less hazardous to an encountering aircraft (e.g., a follower aircraft) than a vortex having other characteristics. For example, studies by the inventors have demonstrated that the peak core tangential velocity is a pertinent characteristic parameter of a vortex to characterize the vortex strength, and is to be reduced in order to attain a weaker and less hazardous vortex. Another characteristic parameter of a vortex is the vortex core radius, which must be increased in order to attain a weaker and less hazardous vortex. Still another pertinent vortex parameter is a vortex spacing.

These vortex parameters are all influenced advantageously by an appropriate setting of the spoiler or spoilers of the aircraft. The optimum spoiler setting is determined depending on the flight phase and is maintained constant during the pertinent flight phase or condition (with other flight attitude and control settings also being constant), but is changed as necessary when changing from one flight phase or condition to another. Particularly, the optimum spoiler setting for any given flight phase, involving a particular aircraft attitude and settings of other control elements, is determined so that the vortex attenuation effect is maximized by changing the specific vortex characteristic or characteristics as necessary, while the degradation or disturbance of the flight performance of the aircraft in this flight phase is minimized. The flight performance can involve various factors, but can be represented, for example, by the overall flying efficiency of a given flight attitude and control condition.

More particularly, in a special optional embodiment of the invention, the optimum spoiler setting is selected in an optimum range or region of spoiler settings between a spoiler deflection region with significant change of the vortex parameter per change of spoiler deflection, and another spoiler deflection region without significant change of the vortex parameter per change of spoiler deflection. The optimum spoiler setting can further be selected to maximize the ratio of the spoiler influence on the pertinent wake vortex parameter (s) relative to the spoiler influence on the aircraft performance at that spoiler setting.

The inventive method of controlling an aircraft in flight in one embodiment involves controlling the aircraft thrust (e.g. controlling the engines to adjust the produced thrust) to provide the required propulsion and a pre-determined airspeed relative to the air through which the aircraft flies, and adjusting one or more aerodynamic control elements so that the aircraft follows a desired trajectory or flight path through the air. The inventive method in this embodiment further involves determining a wake vortex parameter as a function of a spoiler deflection or setting angle (or generally a spoiler extension or deployment setting), and then adjusting the spoiler to an optimum value of the spoiler setting angle at which the influence of the spoiler on aircraft performance is minimized for the influence of the spoiler on the wake vortex parameter being maximized. This can involve maximizing the ratio of the spoiler influence on the wake vortex parameter relative to the spoiler influence on the aircraft performance.

In further detailed embodiments, the optimum spoiler setting angle is determined by determining a first range or region of the spoiler setting angles in which the first derivative of the pertinent wake vortex parameter relative to the spoiler setting angle is not zero or particularly is negative, further determining a second region of the spoiler setting angles in which the first derivative of the pertinent wake vortex parameter relative to the spoiler setting angle is substantially zero or even positive, and determining an optimum spoiler setting region encompassing the optimum spoiler setting angle between the first region and the second region, or determining a particular optimum spoiler setting angle at a point of intersection of the first and second regions.

According to further preferred details of particular embodiments of the inventive method, the wake vortex parameter can be any one or more parameters selected from the group of a peak vortex core tangential velocity, a vortex core radius, or a vortex spacing. The desired trajectory or flight path of the aircraft in a particular embodiment covers the take-off phase and/or the landing phase of the aircraft. During these phases, it is most important to reduce the wake turbulence effects.

It is an advantage of the invention that airport throughput can be increased by reducing the safe separation distances between successive aircraft, in comparison to separation distances that would otherwise have to be observed for wake turbulence safety without application of the inventive method. Namely, by employing the inventive method, the longitudinal separation distances between successive aircraft can be below those that are specified by the current Wake Turbulence Separation Standards for present-day aircraft approaching the terminal area of an airport.

BRIEF DESCRIPTION OF THE DRAWINGS

In order that the invention may be clearly understood, it will now be described in further detail in connection with an example embodiment, with reference to the accompanying drawings, wherein.

DETAILED DESCRIPTION OF PREFERRED EXAMPLE EMBODIMENTS AND THE BEST MODE OF THE INVENTION

Figure 1:
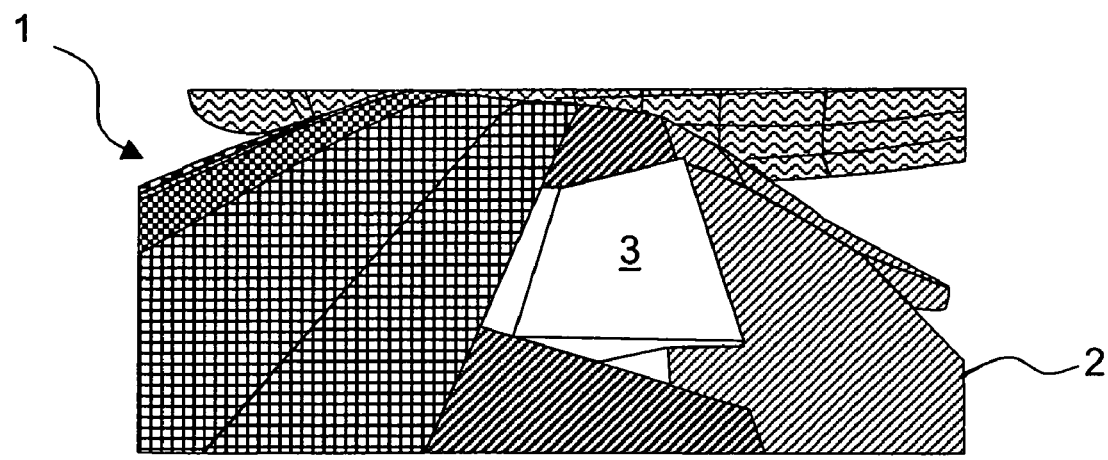
FIG. 1 is a schematic perspective view of an aircraft wing suitable for carrying out an embodiment of the method according to the invention.

FIG. 1 schematically shows a portion of an aircraft wing 1 including several high-lift elements 2 such as flaps. Further, the wing 1 is equipped with several spoiler elements 3 that can each be individually deflected. Only one of the spoiler elements 3 is shown deflected in FIG. 1 for the sake of clarity. These spoiler elements 3 can be deflected asymmetrically on the two wings of the aircraft to enhance roll control, or can be deflected symmetrically on both wings of the aircraft to enhance a steep descent and/or provide an airbrake effect.

Further according to the invention, the spoiler elements 3 may be appropriately deflected to advantageously influence, i.e. reduce, the generation and the development of wake vortices trailing from the wing 1. Particularly, the invention defines an optimum spoiler setting of the deflection of one or more spoiler elements 3 to achieve a best compromise between maximizing the effect of the spoiler element or elements on wake vortex alleviation and minimizing the effect of the spoiler element or elements on the aircraft performance, e.g. the efficiency with which the aircraft flies. Such use of the spoiler elements 3 to alleviate or reduce the wake vortex is especially pertinent during the take-off phase and the landing phase of the aircraft.

Figure 2:
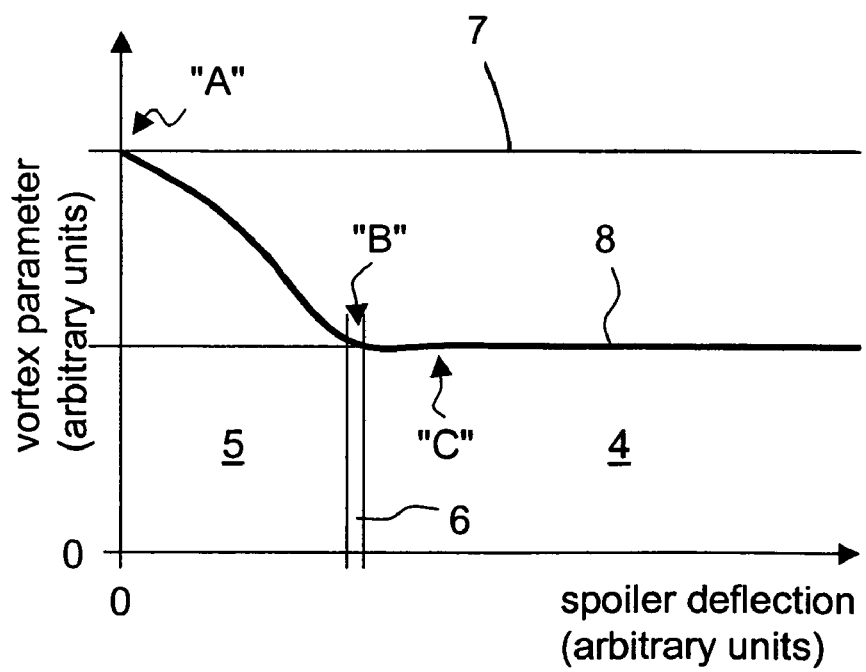
FIG. 2 is a schematic diagram showing variation of a specific vortex parameter as a function of a spoiler deflection angle, in connection with an embodiment of the inventive method.

FIG. 2 diagrammatically shows the influence or effect of spoiler deployment on a vortex parameter such as the vortex peak core tangential velocity, the vortex core radius, or the vortex spacing. The selected vortex parameter is presented in arbitrary units (which may be positive or negative) on the ordinate, while the spoiler deflection is presented in arbitrary units (increasing to the right) on the abscissa. The change of the vortex parameter as a function of the spoiler deflection is displayed as a bold line ranging between a maximum 7 and a minimum 8. In general, three regions of the characteristic change or variation of the vortex parameter relative to the spoiler deflection can be distinguished in FIG. 2, as follows.

In a first region 5, there is a significant change of the vortex parameter per change of the spoiler deflection. Particularly, the bold line representing the vortex parameter function slopes downwardly, i.e. has a non-zero and particularly a negative first derivative, in this first region 5, indicating that the pertinent vortex parameter is reduced as the spoiler deflection increases in this first range or region 5.

It has been demonstrated in ground and flight tests that a symmetric spoiler deflection has the potential of wake alleviation if the constant or fixed spoiler deflection exceeds 40°. However, such large deflection angles would seriously deteriorate the overall aircraft performance due to reduced lift and increased drag resulting from the spoiler deflection. That directly prevents use of such large spoiler deflection settings for a widespread continuous application in flight for the purpose of wake alleviation. Instead, such large spoiler deflections are only suitable for intermittent and temporary use of the spoilers in airbrake mode or steep approach mode for glide slope capture. On the other hand, the spoiler deflection must be minimized for standard approach or landing operation, in order to minimize the penalties on efficiency and economy imposed by the spoilers. Thus, the invention especially aims to use spoiler deflection angles of less than 40°, preferably not more than 20°, and more preferably at about 15° (e.g. 15°±2°) as discussed below.

In a second region 4 in FIG. 2, the vortex parameter is substantially independent of any further change of the spoiler deflection. In other words, the first derivative of the vortex parameter function relative to spoiler deflection is zero (or could even become positive). Also, the vortex parameter takes its minimum value 8 and is not reduced further even for further deflection of the spoiler element or elements 3. This demonstrates that large spoiler deflection angles exceeding 40°, within the second region 4, do not achieve a further enhanced effect on wake vortex alleviation, but instead only further deteriorate the aircraft performance without a further reduction of the chosen vortex parameter.

In view of the above, according to the invention, an optimum spoiler deflection angle or setting in order to reduce the vortex effect on a follower aircraft as much as possible, without suffering an unnecessary performance penalty, is selected in an optimum region 6 between the first region 5 and the second region 4. Particularly, this optimum region 6 of spoiler deflection is located between or at an intersection of the two regions 4 and 5. More particularly, the optimum region 6 encompasses an intersection of a first portion of the vortex parameter function line sloping downwardly to the right, and a second portion of the vortex parameter function line continuing substantially horizontally to the right in FIG. 2. In this optimum region 6, the vortex parameter changes rapidly with small changes of the deflection angle of the spoiler element 3, and so the optimum spoiler deflection may be easily found within this optimum region 6. Particularly, the reduction of the pertinent vortex parameter can be maximized, i.e. the vortex parameter can be reduced to its minimum value 8, while on the other hand, the flight performance is not unnecessarily deteriorated, i.e. is affected as little as possible, because the vortex parameter is at or close to its minimum, while the spoiler deflection is at its minimum or lowest value for achieving that minimum value of the vortex parameter.

Thus, the first region 5 and the second region 4 of spoiler deflection or setting angles can be defined by differentiating the specific vortex parameter as a function of the spoiler deflection or setting angle. Then, the first region 5 is defined as the region in which the first derivative of the vortex parameter function is not zero, and particularly is negative for increasing spoiler deflection. The second region 4 is defined as the region in which the first derivative of the vortex parameter function is substantially zero or even becomes positive. The optimum spoiler deflection or setting angle is selected in the optimum region 6 at the point of intersection or the range between the first region 5 and the second region 4. The optimum spoiler deflection can optionally be defined as a point at which the first derivative of the vortex parameter function (or a smoothed version thereof) changes from negative to zero, or just before this function changes from negative to zero, e.g. at a small negative value of the first derivative of the function.

If it is considered that the aircraft performance factors are detrimentally influenced more as the spoiler deflection increases (which is generally applicable), it is further recognized that the optimum region 6 represents the spoiler deflection setting (or small range of settings) that achieve the maximum possible vortex alleviation in combination with the minimum aircraft performance deterioration for achieving that maximum vortex alleviation. In other words, no unnecessary aircraft performance penalty is suffered for achieving the maximum reduction of the vortex strength. This can further be regarded as maximizing the ratio of the spoiler influence on the pertinent wake vortex parameter or parameters relative to the spoiler influence on the aircraft performance.

Figure 3A:
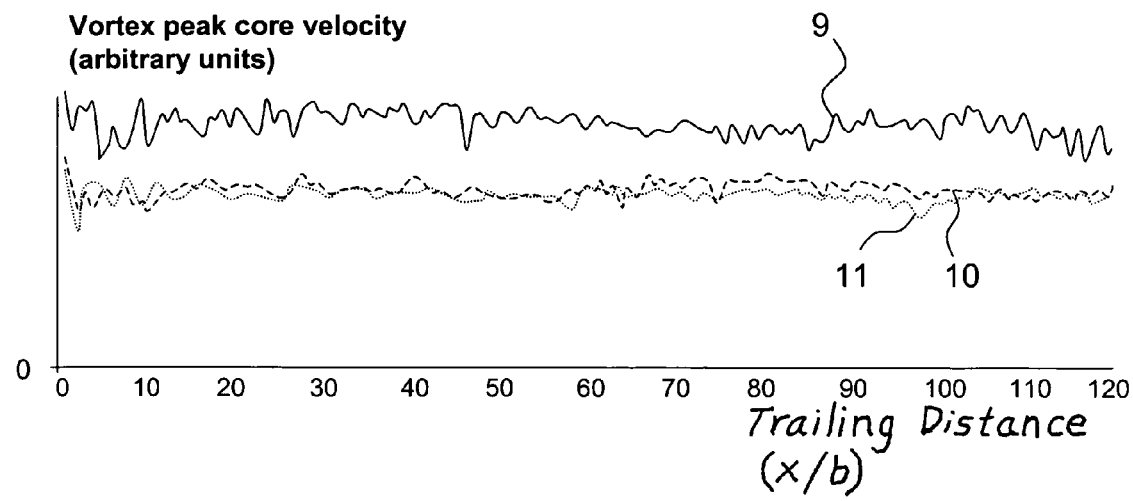
FIG. 3A is a schematic diagram illustrating the vortex peak core velocity as a vortex parameter with respect to the following or separation distance behind an aircraft generating the wake vortex, respectively for three different spoiler deflection settings, in connection with an embodiment of the invention.
Figure 3B:
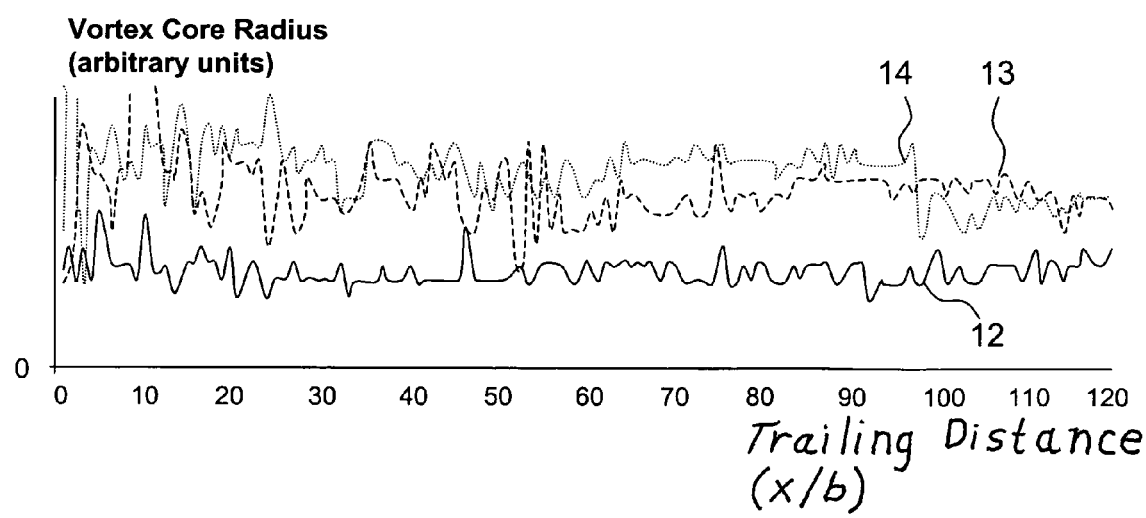
FIG. 3B is a schematic diagram illustrating the vortex core radius as a vortex parameter with respect to the following or separation distance behind an aircraft generating the wake vortex, respectively for three different spoiler deflection settings, in connection with an embodiment of the invention.

A particular example of the effect of different spoiler deflections on two different vortex parameters will be further explained with reference to FIG. 3A and FIG. 3B, which schematically show results of test evaluations. FIGS. 3A and 3B respectively show the evolution and decay of the vortex peak core velocity (FIG. 3A) and the vortex core radius (FIG. 3B) as a function of the normalized distance "x" downstream behind the wake vortex generating aircraft model having a wingspan "b". The respective wake vortex parameter is shown in the respective diagram for three different spoiler deflection angles of a single spoiler element. Namely, in FIG. 3A, the three vortex core velocity function lines or curves 9, 10 and 11 respectively pertain for spoiler deflection angles of 0°, 15° and 20°. Similarly in FIG. 3B, the three vortex core radius function lines or curves 12, 13 and 14 pertain for spoiler deflection angles of 0°, 15° and 20°.

More particularly, FIG. 3A shows a recorded diagram of test data of the vortex peak core tangential velocity of wake vortices as a function of distance behind the wake generating aircraft model. Line or curve 9 represents the vortex velocity with retracted spoilers, i.e. a spoiler deflection angle of 0°, corresponding to the fully retracted spoiler deflection setting A in FIG. 2. The vortex peak core velocity according to curve 9 is rather high and represents a wake vortex that has high vortex strength and that may become hazardous to a following aircraft. With the spoiler deflection set at 20° according to curve 11, the vortex peak core tangential velocity is significantly reduced. This curve 11 corresponds to a spoiler setting in region C in FIG. 2. In other words, this spoiler setting is already in the second region 4 in which unnecessary deterioration of the flight performance is suffered, so that undesirable uneconomical flight conditions prevail. It should then further be appreciated that a significant reduction of the vortex peak velocity is already achieved at a spoiler deflection angle of 15° as shown by curve 10, which corresponds to the spoiler setting in region B in FIG. 2. Thus, it can be seen that a spoiler deflection angle of 15° (curve 10) achieves essentially the same reduction of the vortex velocity as a spoiler deflection angle of 20° (curve 11), but provides a much more economical flight condition, because the aircraft performance is not deteriorated as much with spoilers set at 15° in comparison to spoilers set at 20°. In other words, the spoiler influence on the wake vortex alleviation saturates after a spoiler deflection of 15°, but the spoiler influence on aircraft performance continues to increase as the deflection angle increases beyond 15°. Thus, the spoiler deflection angle of 15° according to curve 10 is within the optimum deflection region 6 in FIG. 2.

The above described effects of different spoiler settings on the vortex peak core tangential velocities are confirmed by measurements of the respective vortex core radii for the respective different spoiler settings of 0, 15° and 20° as shown in FIG. 3B. The smallest vortex radius (and associated highest vortex strength) arises with full retraction of the spoilers to a spoiler deflection of 0° as shown by curve 12 corresponding to the spoiler setting A in FIG. 2. The vortex radius becomes larger (and vortex strength becomes smaller) as the spoiler deflection becomes larger. However, just as with the change of the vortex velocity discussed above, the effect on the vortex radius does not change significantly between a spoiler deflection angle of 15° shown by curve 13 at spoiler setting B, and a spoiler deflection angle of 20° shown by curve 14 at spoiler setting C. In other words, the two curves 13 and 14 have substantially the same vortex core radius, while the spoiler setting at 15°(curve 13) produces better aircraft performance and efficiency in region B than the spoiler deflection angle of 20° (curve 14) in region C. Thus, just as for the vortex velocity discussed above, the optimum spoiler deflection setting is 15° in the optimum region 6, for maximizing the vortex radius while minimizing the negative influence on aircraft performance.

In the above discussed tests, the changes of the specific vortex parameter as a function of spoiler deflection angle were measured up to a deflection angle of 20°. Spoiler settings at additional deflection angles were also tested, but are not illustrated, for the sake of clarity of the figures. The optimum spoiler setting was found to be at approximately 15° in this particular example embodiment. However, the optimum spoiler deflection setting in other cases depends on the aircraft type and the aircraft configuration, which is linked to the flight phase in which the aircraft is flying.

As demonstrated in FIGS. 3A and 3B, the specific vortex parameter of interest may be the vortex peak core velocity or the vortex core radius. Another pertinent vortex parameter is the vortex spacing. Any of these vortex parameters and particularly vortex velocities may be measured by various conventional systems, e.g. by a LIDAR (Light Detection And Ranging) system, a laser-Doppler velocimeter, an array of monostatic acoustic sounders, and/or an array of propeller anemometers, or by other systems. These devices are preferably deployed on the ground, and measurements are carried out as a test aircraft flies by the instruments. The resulting relation between the spoiler deflection angle and the respective characteristic vortex parameter is measured as a function of trailing distance behind the aircraft, and is recorded and stored. The resulting data may be further processed to develop pertinent relationships that are stored in a control computer on board the aircraft, and may be used when the effect of wake vortices on follower aircraft is to be prevented or mitigated. In other words, the computer issues suitable control commands to the actuators of the spoilers to appropriately deploy the spoilers for wake alleviation when necessary.

As an alternative, the relationship between the spoiler deflection angle and a specific vortex parameter can be determined by airborne test apparatuses instead of ground-based test apparatuses. Such airborne test apparatuses may be installed on the aircraft being tested, or on other aircraft flying behind the aircraft being tested.

The inventive method is applicable to the deployment of either one spoiler element or plural spoiler elements or one spoiler or plural spoilers. This will only depend on the respective aircraft at issue and the actual flight situation. The selection of spoiler elements to be used for a given situation can be determined during flight tests.

Through the application of the inventive method, it is possible for the first time that an aircraft can benefit from a reduced required wake turbulence separation, i.e. below the presently mandated Wake Turbulence Separation Standards with respect to the weight category of the aircraft, if the aircraft is the leader aircraft and is equipped with a wake alleviation system including spoilers or other aerodynamic control elements that are operated according to the inventive method. Through its general application, the inventive method is expected to provide a significant reduction of future Wake Turbulence Separation Standards for any given aircraft pair of a leader and a follower, for which the leader is equipped to carry out the inventive method.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of controlling an aircraft in flight, comprising the steps:
   a) flying said aircraft along a flight path while said aircraft generates a wake vortex that trails behind said aircraft;
   b) extending an aerodynamic control element of said aircraft whereby said aerodynamic control element is producing an aerodynamic control effect by which said aircraft follows a desired trajectory or flight path, and said aerodynamic control element is also reducing a vortex strength of said wake vortex relative to a condition without said aerodynamic control element extended;
   c) continuing said extending of said aerodynamic control element to increasing extension settings of said aerodynamic control element while said reducing of said vortex strength thereby continues; and
   d) stopping said extending of said aerodynamic control element and maintaining said aerodynamic control element at a particular extension setting of said aerodynamic control element when a rate of reduction of said vortex strength relative to an increase of said increasing extension settings diminishes or no later than when said rate of reduction reaches zero.

2. The method according to claim 1, wherein said particular extension setting is a least-deflected extension setting of said aerodynamic control element that achieves a maximum of said reducing of said vortex strength for at least a specified flight phase of said flying of said aircraft.

3. The method according to claim 1, wherein said aerodynamic control element is a spoiler element.

4. The method according to claim 3, wherein said particular extension setting is a spoiler deflection angle of said spoiler element, and said spoiler deflection angle is less than 40°.

5. The method according to claim 4, wherein said spoiler deflection angle is not more than 20°.

6. A method of reducing a wake vortex generated by and trailing behind an aircraft in flight, comprising the steps:
   a) determining a wake vortex parameter that characterizes a vortex strength of said wake vortex as a function of a spoiler deflection angle of a spoiler element of said aircraft;
   b) flying said aircraft along a flight path while generating said wake vortex;
   c) determining a selected value of said spoiler deflection angle and deflecting said spoiler element to said selected value of said spoiler deflection angle at which said spoiler element produces a maximum change of said wake vortex parameter relative to a zero value of said spoiler deflection angle, and at which said spoiler element produces a minimum change of a flight efficiency of said aircraft flying along said flight path while producing said maximum change of said wake vortex parameter, wherein said determining of said selected value of said spoiler deflection angle comprises determining a first region of said function in which said vortex strength diminishes with increasing values of said spoiler deflection angle, and determining a second region of said function in which said vortex strength does not further diminish with increasing values of said spoiler deflection angle, and determining an optimum region of said function between said first and second regions, and selecting said selected value as a value of said spoiler deflection angle in said optimum region.

7. The method according to claim 6, wherein said determining of said selected value of said spoiler deflection angle comprises determining said first region of said function as a region in which a first derivative of said function is negative, and determining said second region of said function as a region in which a first derivative of said function is non-negative.

8. The method according to claim 6, wherein said wake vortex parameter is a peak vortex core tangential velocity.

9. The method according to claim 6, wherein said wake vortex parameter is a vortex core radius.

10. The method according to claim 6, wherein said wake vortex parameter is a vortex spacing.

11. The method according to claim 6, wherein said flight path is a landing approach path of said aircraft.

12. The method according to claim 6, wherein said selected value of said spoiler deflection angle is less than 40°.

13. The method according to claim 6, wherein said selected value of said spoiler deflection angle is not more than 20°.

14. The method according to claim 6, wherein said selected value is a value of said spoiler deflection angle which maximizes a ratio of said change of said wake vortex parameter relative to said change of said flight efficiency.

15. A method of controlling an aircraft in flight through air, comprising the steps:
   a) controlling at least one engine of said aircraft to produce a selected propulsion and a selected speed of said aircraft relative to the air;
   b) adjusting high-lift devices and control surfaces of said aircraft so that said aircraft flies along a selected trajectory;

c) determining a wake vortex parameter of a wake vortex trailing behind said aircraft as a function of a spoiler setting angle of spoilers of said aircraft, wherein said function includes a first region (5) of values of said spoiler setting angle in which a first derivative of said function is non-zero, and a second region (4) of values of said spoiler setting angle in which the first derivative of said function is substantially zero, and d) adjusting said spoiler setting angle of said spoilers to a value between or at an intersection of said first and second regions.

16. The method according to claim 1, further comprising, after said step d), further deflecting said aerodynamic control element away from and relative to said particular extension setting to vary said aerodynamic control effect as necessary for said aircraft to follow said desired trajectory or flight path, in a range of said extension settings of said aerodynamic control element without significantly increasing said vortex strength relative to said particular extension setting.

17. The method according to claim 2, wherein said specified flight phase comprises at least one of a landing phase or a take-off phase of said flying of said aircraft.

18. The method according to claim 1, wherein said aerodynamic control effect comprises at least one of a roll control, a steep descent control, or an airbrake effect.

* * * * *